United States Patent
Masters et al.

(10) Patent No.: US 7,513,209 B2
(45) Date of Patent: *Apr. 7, 2009

(54) TWIN FIN FAIRING

(75) Inventors: Rodney H. Masters, Houston, TX (US); Randy W. Masters, Houston, TX (US); Michael Sykes, Spring, TX (US); Steven J. Leverette, Richmond, TX (US); Kenneth J. Schaudt, Katy, TX (US)

(73) Assignee: Seahorse Equipment Corporation, Houston, TX (US)

( * ) Notice: Subject to any disclaimer, the term of this patent is extended or adjusted under 35 U.S.C. 154(b) by 17 days.

This patent is subject to a terminal disclaimer.

(21) Appl. No.: 11/684,861

(22) Filed: Mar. 12, 2007

(65) Prior Publication Data

US 2008/0035351 A1    Feb. 14, 2008

Related U.S. Application Data

(63) Continuation-in-part of application No. 11/463,413, filed on Aug. 9, 2006, now Pat. No. 7,337,742.

(51) Int. Cl.
  *F15D 1/10* (2006.01)
(52) U.S. Cl. ...................................... 114/243
(58) Field of Classification Search .................. 114/243
  See application file for complete search history.

(56) References Cited

U.S. PATENT DOCUMENTS

| | | | |
|---|---|---|---|
| 3,209,718 A * | 10/1965 | Rather et al. ................. | 114/243 |
| 3,241,513 A | 3/1966 | Rather et al. | |
| 3,454,051 A | 7/1969 | Goepfert et al. | |
| 3,859,949 A | 1/1975 | Toussaint et al. | |
| 4,365,574 A | 12/1982 | Norminton et al. | |
| 4,398,487 A | 8/1983 | Ortloff et al. | |
| 4,474,129 A | 10/1984 | Watkins et al. | |
| 4,542,708 A | 9/1985 | Holcombe et al. | |
| 4,655,682 A * | 4/1987 | Kunz et al. .................. | 415/119 |
| 4,829,929 A | 5/1989 | Kerfoot | |
| 5,410,979 A | 5/1995 | Allen et al. | |
| 5,456,199 A | 10/1995 | Kernkamp | |
| 6,048,136 A | 4/2000 | Denison et al. | |
| 6,062,769 A | 5/2000 | Cunningham | |
| 6,067,922 A | 5/2000 | Denison et al. | |
| 6,092,483 A | 7/2000 | Allen et al. | |
| 6,223,672 B1 | 5/2001 | Allen et al. | |
| 6,244,204 B1 | 6/2001 | Weyman et al. | |
| 6,401,646 B1 | 6/2002 | Masters et al. | |
| 6,517,289 B1 * | 2/2003 | Coakley et al. ............. | 405/216 |

* cited by examiner

*Primary Examiner*—Stephen Avila
(74) *Attorney, Agent, or Firm*—Fulbright & Jaworski, LLP (57) ABSTRACT

A fairing for the reduction of vortex-induced vibration and the minimization of drag about a substantially cylindrical element immersed in a fluid medium. The fairing also eliminates the galloping phenomenon typically associated with a teardrop-shaped fairing. The fairing having a U-shaped cylindrical shell with opposing edges defining a longitudinal gap and parallel fins extending outwardly from the opposing edges of the shell, the parallel fins being positioned so as to reduce vortex-induced vibration, minimize drag and to eliminate the galloping phenomenon on the cylindrical element.

34 Claims, 12 Drawing Sheets

TWIN FIN FAIRING

CROSS REFERENCE TO RELATED APPLICATIONS

This application is a continuation-in-part of U.S. Ser. No. 11/463,413 filed Aug. 9, 2006, now U.S. Pat. No. 7,337,742 issued Mar. 4, 2008 which is herein incorporated in its entirety.

TECHNICAL FIELD

The present invention relates generally to the reduction of vortex-induced vibration ("VIV") and more particularly to a fairing used for the reduction of VIV on pipes or other structural components immersed in a fluid.

BACKGROUND OF THE INVENTION

Exploration for oil and natural gas reserves led drillers offshore many years ago and as offshore exploration continues, offshore producers find themselves in deeper and deeper waters. While those waters may bring the reserves they seek, the offshore producers are also faced with stronger currents threatening the structural integrity of their risers, pipelines, and other elongated and cylindrical components involved in oil and gas production.

Stresses on the pipes or other structural components immersed in fluid, such as drilling risers, production risers, pipelines, structural tendons, etc. greatly increase as the velocity of the current increases and the stresses are magnified as the depth of the water and length of the risers at the well location increases. When operating rigs in high current areas, the riser is exposed to currents that can cause at least two kinds of stresses. The first is caused by vibration resulting from vortices shed off a component when fluid flows by. That vibration, occurring perpendicular to the current, is referred to as "vortex-induced vibration," or "VIV." When water flows past the riser, it may cause vortices to be alternatively shed from each side of the riser when Reynolds Numbers reach a certain range. If the frequency of this harmonic load is near the resonant frequency of the riser, large vibrations transverse to the current can occur. The second type of stress is caused by the drag forces that push the riser in the direction of the current due to the riser's resistance to fluid flow. The drag forces are significantly amplified by the vortex-induced vibrations of the riser, i.e. a vibrating pipe. A riser pipe that is vibrating due to vortex shedding will disrupt the flow of water around it more than a stationary riser or a non-vibrating pipe. This results in more energy transfer from the current to the riser, and hence more drag.

The movement of oil and gas exploration, development and production into deep and ultra-deep waters has created unique engineering challenges requiring innovative engineering solutions. One particular challenge is the vortex-induced-vibrations (VIV) of long drilling and production risers. As discussed above, when long elements such as subsea pipelines, risers, tendons, umbilicals and cables are affected by relatively strong currents over extended lengths along the element, the currents may cause vortices to be shed from the sides of the element in an alternating manner which can induce VIV. The resulting vibration increases drag, reduces fatigue life and left unchecked may lead to the failure of the marine element or its supports.

Shrouds, strakes and fairings have traditionally been added to risers and other submerged pipes in order to minimize the current-induced stresses on these pipes. Strakes and shrouds can be effective regardless of the current orientation, but they tend to increase the drag acting on the riser. By contrast, fairings are generally more efficient in reducing drag and VIV. Fairings generally comprise streamlined shaped bodies (such as airplane wings) that weathervane or rotate about the riser maintaining positions substantially aligned with the water current. Fairings generally reduce vortex-induced forces and minimize drag on the riser by reducing or breaking up the low pressure areas that exist down-current of the riser.

Figure 2:
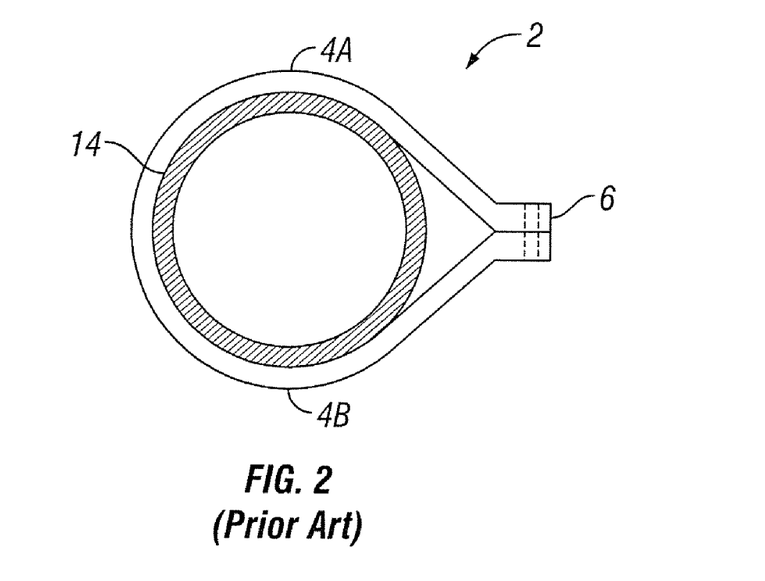
FIG. 2 is a side elevational view of a prior art fairing.

One example of a fairing is found in U.S. Pat. No. 4,474,129 that discloses a fairing removably mountable on risers equipped with buoyancy modules that has a tail tapering aft and a fin positioned after the tail. This fairing completely surrounds the riser and is fastened together at the back portion of the fairing. Another example of a fairing is found in U.S. Pat. No. 4,398,487 which describes a streamlined symmetrical structure having a nose portion, a tail portion and two opposed side portions. This fairing is formed as two shell halves that completely surround the riser and are connected at the front end of the nose by quick release fasteners and at the end of the tail portion by hinges. U.S. Pat. No. 5,410,979 describes a small fixed teardrop-shaped fairing that surrounds a riser and is fixed to the riser so as to not rotate. U.S. Pat. No. 6,048,136 describes a fairing that is installed on a drilling riser in combination with a synthetic foam buoyancy module. This fairing is formed as two shell halves that surround the riser and attach at the front and back portions of the fairing. A rotating fairing is described in U.S. Pat. No. 6,067,922 as including a copper element mounted in the annular region of the fairing to discourage marine growth. This fairing is formed as a single piece that completely surrounds the riser and is attached at the tail or flange portion with bolts. An ultrashort fairing described in U.S. Pat. No. 6,223,672 is shown in FIG. 2. This fairing 2 has a pair of shaped sides 4A, 4B departing from the circular profile of a marine riser and converging at a trailing edge 6. It should be noted that all of the above described fairings are constructed in predetermined lengths and a plurality of fairings are positioned along the length of any particular riser.

While fairings can be effective for reducing VIV, a number of problems still exist with the prior art fairings. As illustrated in the prior art, fairings have become more and more complex in design, they often require a large number of parts, and as such, they have become more costly to produce and maintain. Generally, fairings must be secured to the elongated component by bands, bolts or other fasteners that may fail. Further, the use of such fasteners adds to the cost and labor associated with the fairing's use. Additionally, corrosion and marine growth frequently causes the rotational elements of a fairing to seize up so that it can no longer rotate and properly align with the current. Such a concern has often resulted in fairings being used only on risers or other components that remain on the risers only a short period of time, leaving those in the industry to rely upon less effective VIV reduction means such as fixed-fin vortex strakes for more permanently fixed components.

Although strakes with certain fin heights and fin periods can reduce the amplitude of the VIV induced motion by more than 90% and have been proven to be effective tools, a lower drag solution would be desirable. While conventional teardrop fairings are effective in reducing both drag and VIV, users report that these devices are subject to a "galloping" motion. The causes of this galloping motion remain unclear. Therefore, there remains a need for an improved VIV suppression device that reduces vibration, that does not increase drag and is resistant to galloping motions.

Fairings are typically applied to drilling and/or production risers in one of two ways. In one manner of installation, fairings are placed on the riser after it is in place, suspended between the platform and the ocean floor, in which divers or submersible vehicles (referred to as ROVs) are used to fasten the multiple fairings around the riser. A second method of installation is carried out as the riser is being assembled on a vessel and installed. In this method the fairings are fastened to the pipe as lengths of pipes are fitted together to form the riser. This method of installation is typically performed on a specially designed vessel, called an S-Lay, J-Lay barge or Reel Lay barge. An S-Lay barge is one that has a declining ramp, positioned along a side or rear of the vessel and descending below the ocean's surface, that is equipped with rollers (referred to as a "stinger"). As the lengths of pipe are fitted together, fairings are attached to the connected pipe sections before the pipe is rolled down the ramp and into the ocean. One of the problems of installing fairings in this manner is that when the fins of the fairing rotate over the rollers on the ramp, the fins frequently become damaged by the rollers. In this method of installation, the completed riser laid on the ocean floor, then is pulled up to a vertical position when it reaches the appropriate length and is attached to the surface platform and the well head on the ocean floor.

It would be advantageous to provide a relatively lightweight, resilient fairing that can be easily placed on a riser rather than having to be fastened around the entire circumference.

It would be advantageous to provide a fairing that reduces vibration, that does not increase drag and is resistant to galloping motions.

BRIEF SUMMARY OF THE INVENTION

The subject invention is directed to a fairing for the reduction of vortex-induced vibration, the minimization of drag and the elimination of galloping about a substantially cylindrical element immersed in a fluid medium. The fairing has a U-shaped cylindrical shell with opposing edges defining a longitudinal gap and parallel fins extending outwardly from the opposing edges of the shell, the parallel fins being positioned so as to reduce vortex-induced vibration, minimize drag and to eliminate the phenomenon of galloping on the cylindrical element. The fairing has a length to diameter ratio of 1.5 to 2.50 and preferably a ratio of 1.75 to 2.0 where the length is measured from the leading nose of the fairing body to the end of the fins, and the diameter is the diameter of the center of the circle defining the shell.

The shell has an outer diameter D and the parallel fins have a distance W between opposing edges of the fins. The ratio of W to D is from W=D to W=75% of D. The fins of the fairing can taper inward.

The fairing further includes a bearing pad configured to fit in the gap in the shell between the shell's opposing edges and the parallel fins. The bearing pad has a curved inside surface and side surfaces in parallel alignment with each of the fins. Each fairing includes a plurality of bearing pads for securing the fairing to a cylindrical element.

The fairing further includes at least a set of opposed connectors for securing the fairing to a cylindrical element, each connector being positioned on an inside surface of each parallel fin. The fins can include three sets of opposed connectors. Each connector includes an opening configured to receive a fastening means for securing the opposing connectors together.

The fairing further includes a flange at a top and bottom edge of the fairing, the flange extending around the circumference of the shell and outwardly from the shell. The flange can include one or more V-shaped cutouts for the creation of opening hinges.

Each fin on the fairing does not extend beyond the outer diameter of the shell.

The fairing is constructed from a non-metallic, low corrosive material selected from a group consisting of polyethylene, polyurethane, vinyl ester resin, poly vinyl chloride and fiberglass.

The invention also includes a fairing system for the reduction of vortex-induced vibration and the minimization of drag about a substantially cylindrical element immersed in a fluid medium. The fairing system has a plurality of fairings having U-shaped cylindrical shells, each shell having opposing edges defining a longitudinal gap. Parallel fins extending outwardly from the opposing edges of each of the plurality of shells, the parallel fins being positioned so as to reduce vortex-induced vibration, minimize drag and the elimination of galloping on the cylindrical element. The fairing includes means for securing each of the plurality of fairings around the cylindrical element.

The collar includes a plurality of compliant annulus spacers extending outwardly from an inside surface of the collar, the spacers being configured to induce frictional interaction between the collar and the cylindrical element.

The means for securing the fairings around the cylindrical element includes a bearing pad configured to fit in the gap in each shell between the shell's opposing edges and the parallel fins. The bearing pad has a curved inside surface and side surfaces in parallel alignment with each of the fins. Each fairing includes a plurality of bearing pads for securing the fairing to a cylindrical element.

An alternate means for securing the fairings around the cylindrical element include at least a set of opposed connectors, each connector being positioned on an inside surface of each parallel fin. The fins can include a plurality of opposed connectors. Each connector includes an opening configured to receive a fastening means for securing the opposing connectors together.

The fairing further may include a flange at a top and bottom edge of the fairing, the flange extending around the circumference of the shell and outwardly from the shell. The flange can include at least one V-shaped cutouts. The flanges on each fairing are configured such that they allow each fairing to freely rotate on an adjoining fairing.

A circular collar can be positioned between a group of or each of the plurality of fairings and the collar being configured such that it allows each fairing to freely rotate on the collar. The collar is in two sections held together by means for securing the collar around the cylindrical element. The collar is fixed to the riser and does not rotate.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

The present invention is directed to rotating fairings that include specifically placed fins for the reduction of vortex-induced vibration ("VIV") on pipes or other structural components immersed in fluid. As discussed above, when a solid object is exposed to fluid flows vibration results from vortices shed off the object when the fluid flows by it. The flow pattern around a cylinder can be characterized by the Reynolds Number (Re) of the incident flow and the location where flow separates from the cylinder surface which depends on whether the boundary layer is turbulent or laminar. In the subcritical range, the Reynolds number range is $300<Re<1.5\times10^5$, the laminar boundary layers separate at about 80 degrees aft of the leading edge of the cylinder and vortex shedding is strong and periodic. The range $1.5\times10^5<Re<3.5*10^6$ is called the transition region. In these regions the boundary layer becomes turbulent and the separation points move aft to 140 degrees and the cylinder drag coefficient drops abruptly.

A fairing is described in U.S. Pat. No. 6,401,646 that includes a cylindrical shell having opposing edges defining a longitudinal gap and a pair of corresponding fins extending outwardly in a vertical direction. The fins are placed generally at a 120° angle relative to the circumference of the shell. U.S. Pat. No. 6,401,646 is incorporated herein in its entirety. During hydrodynamic testing, it has been discovered that a U-shaped fairing having parallel twin fins causes a substantial reduction in VIV and drag forces and the inventive faring is not affected by a galloping motion.

Figure 1:
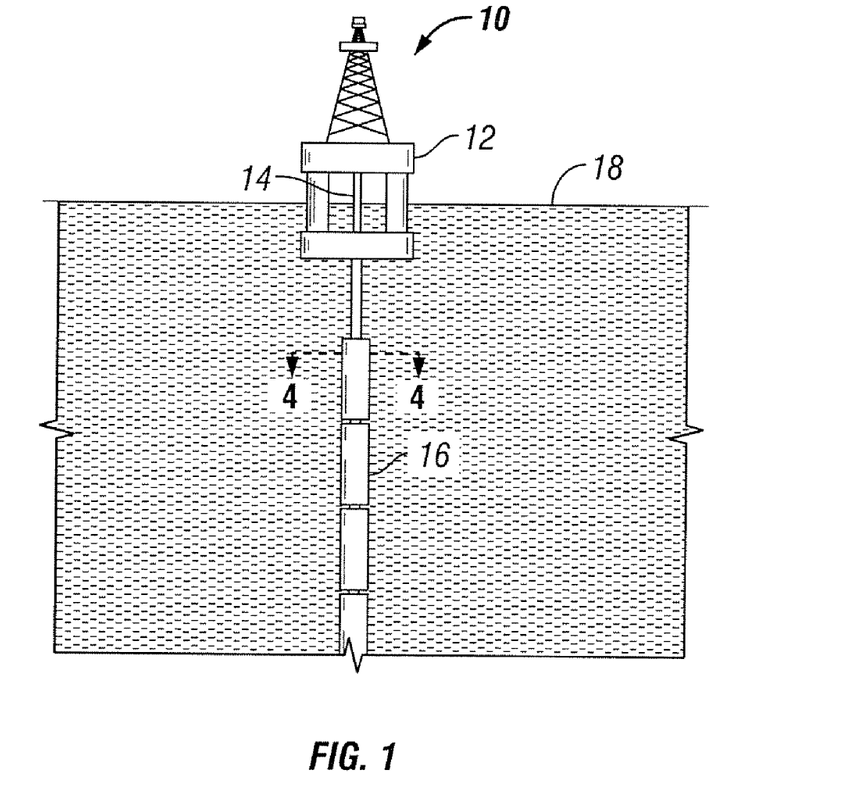
FIG. 1 is a side elevational view of a drilling vessel illustrating the use of the inventive fairings in one of the environments in which the invention is used.

The present invention is directed to a rotatable U-shaped fairing system having parallel twin fins for the reduction of VIV on pipes or other structural components immersed in fluid. In one embodiment, the inventive fairing is installed on drilling and production risers used in offshore oil and natural gas exploration. FIG. 1 illustrates one environment in which the inventive fairing is used. A drilling vessel or platform 10 provides surface facilities 12. Riser 14 descends from beneath the deck of the surface facilities 12 and is fitted with large OD buoyancy modules which are fitted with twin fin fairings 16 below the ocean surface 18. A plurality of fairings 16 are installed along the riser 14 to reduce VIV and minimize drag on the long unsupported riser 14. This illustrative embodiment shows the fairing system installed on a drilling or production riser. However, cylindrical pipes are employed in a variety of other applications such as subsea pipelines; drilling, import and export risers; tendons for tension leg platforms; legs for traditional fixed and for compliant platforms; other mooring elements for deepwater platforms; and so forth. Those having ordinary skill in the art can readily apply these teachings to such other applications.

Figures 3, 4:
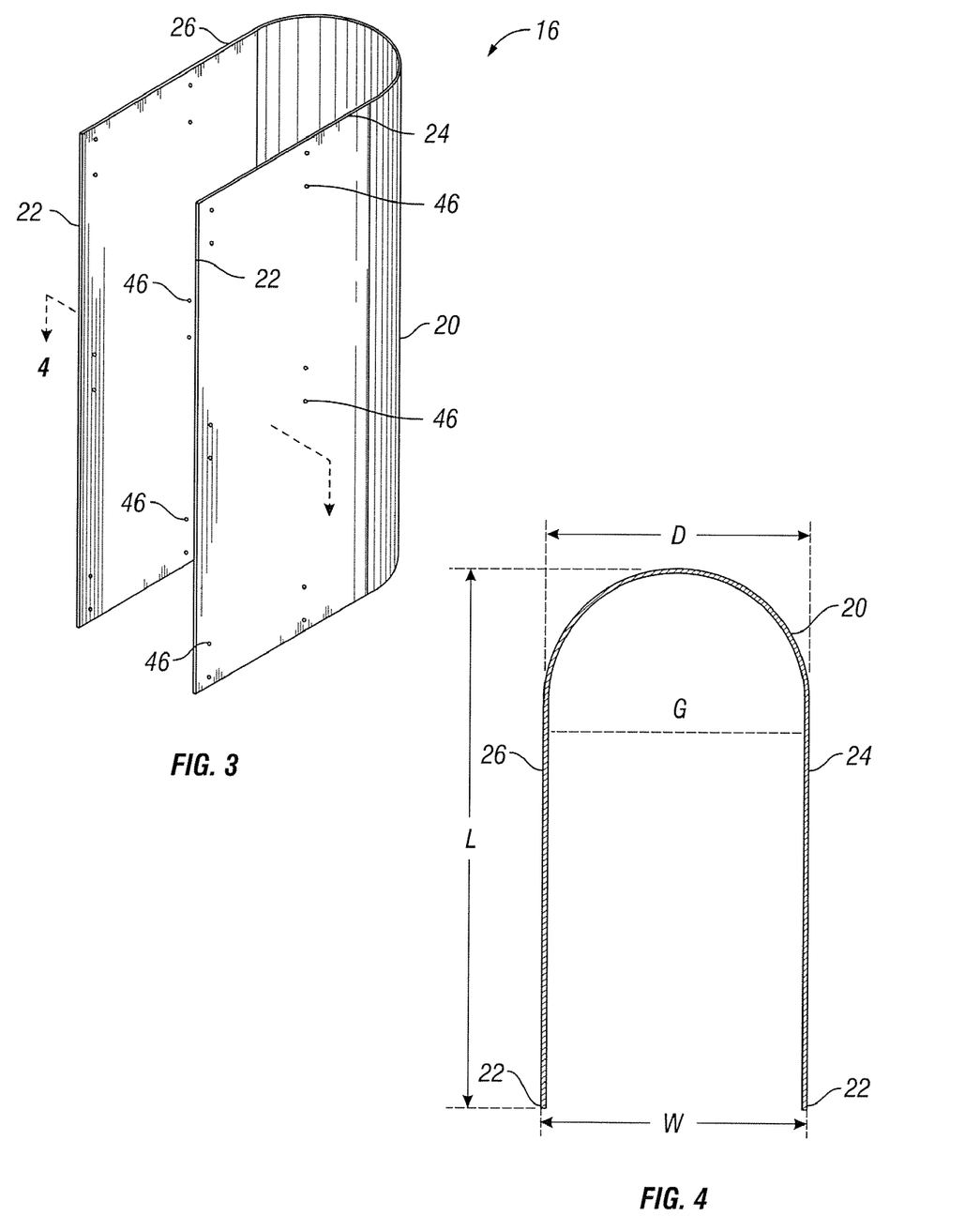
FIG. 3 is a perspective view of one embodiment of the fairing of the present invention.
FIG. 4 is a cross-sectional view of the inventive fairing taken along lines 4-4 of FIG. 3.

Fairing 16 is formed from a U-shaped shell 20 having opposing edges 24, 26 that define a longitudinal gap G and a pair of corresponding fins 22 extending outwardly from edges 24, 26 in a vertical direction (FIGS. 3 and 4). The spaced apart fins 22 are parallel to each other and extend outwardly in a direction parallel with the fluid current in order to move the boundary layer vortex eddies further away from the riser 14 without adding significant drag (FIG. 4). The fins 22 can be any length, however, regardless of the length, the fins 22 do not extend beyond the nominal outer diameter of the shell 20. Preferably, fairing 16 has dimensions of length L to diameter D (shell diameter) such that the length L to diameter D ratio (aspect ratio) is in the range of 1.5 to 2.50, preferably in the range of 1.75 to 2.0. The shell's U-shape provides for a longitudinal gap G in shell 20 that allows for placement of the shell 20 around a cylindrical object such as a riser (FIG. 5A).

Figure 5A:
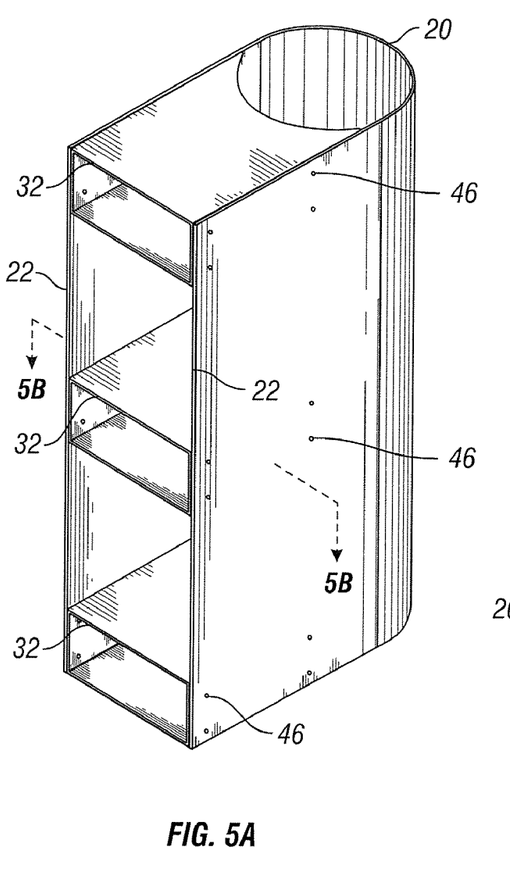
FIGS. 5A and B is a perspective view of the fairing of FIG. 3 with bearing pads installed; is a cross-sectional view of the fairing taken along lines 6-6 of FIG. 5.
Figure 5B:
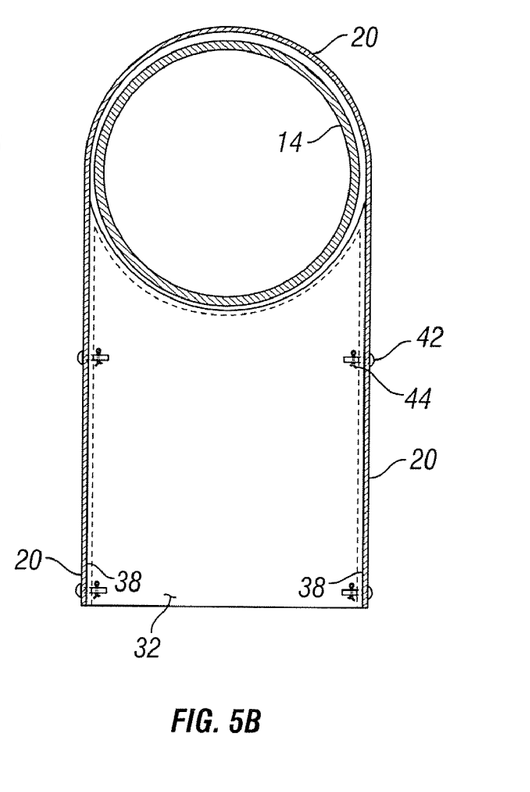
Figure 6A:
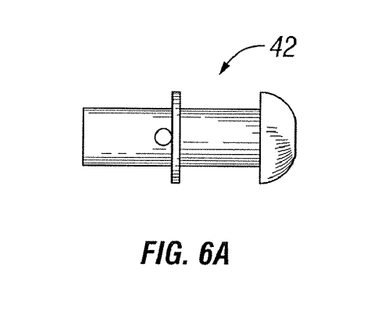
FIGS. 6A and B illustrate a fastener for securing the bearing pads to the fairing in FIG. 5A.
Figure 6B:
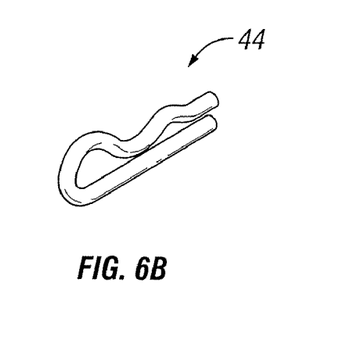
Figure 7:
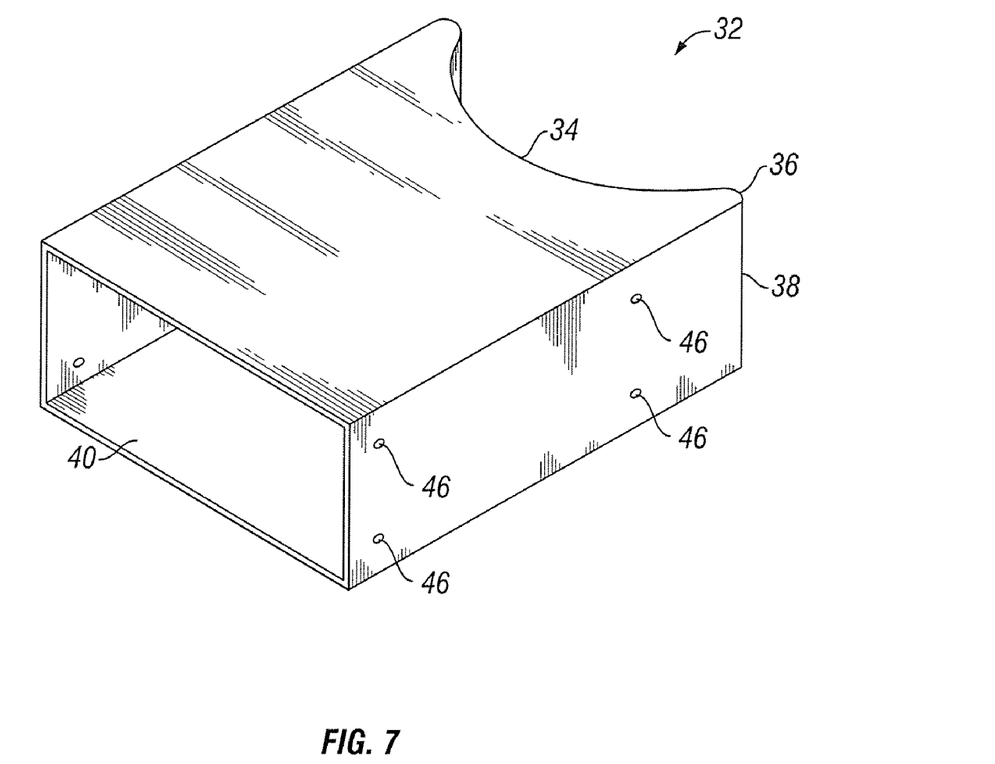
FIG. 7 is a perspective view of a bearing pad of FIG. 5.
Figure 8:
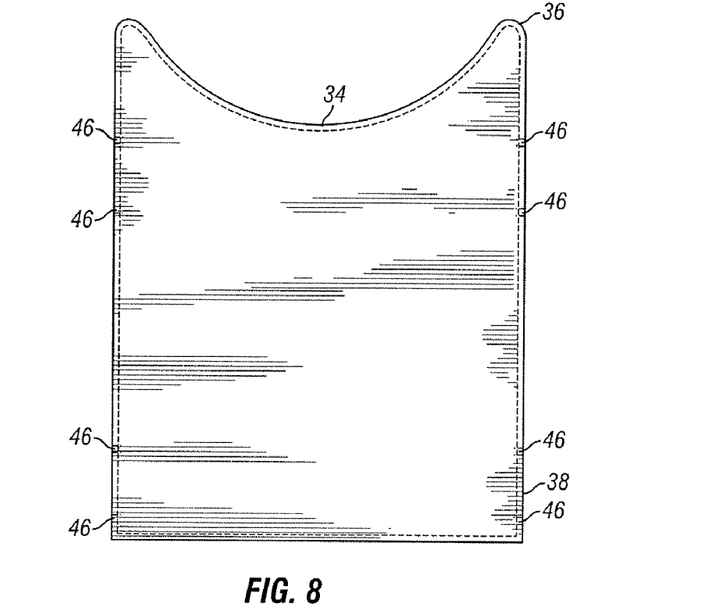
FIG. 8 is a top plan view of the bearing pad of FIG. 7.

Fairing 16 is secured to the riser 14 with bearing pads 32 that are configured to fit in the gap G in the shell 20 between the fins 22 (FIGS. 5, 5A). Each bearing pad 32 has a curved inside surface 34, end portions 36 and side surfaces 38. The inside surface 34 has a curve that completes the circle of the shell's circumference. The end portions 36 are configured to fit in the space between the opposing edges 24, 26 and the riser 14 and the side surfaces 38 are configured to align with the fins 22 (FIG. 5). In a preferred embodiment, the back portion 40 of the inside surface 34 is open (FIGS. 5, 5A, 7). The bearing pads 32 can be secured to the shell 20 by any number of means known to one skilled in the art. An example of one securing means is a threadless bolt 42 (FIG. 6A) with a washer and cotter pin 44 (FIG. 6B) in which the bolt is placed through a pair of aligned openings 46 in fins 22 and in the side surfaces 38 of the bearing pad 32 (FIG. 5A).

The number of bearing pads 32 required to secure the fairing 16 to a riser 14 will depend upon the length of the fairing and the amount of external forces being placed on the riser. For example, if a fairing has a length of about 4½ feet, three bearing pads 32 spaced about 23 inches apart, could be used to secure the fairing 16 to a section of the riser 14 as illustrated in FIG. 5.

Figure 9:
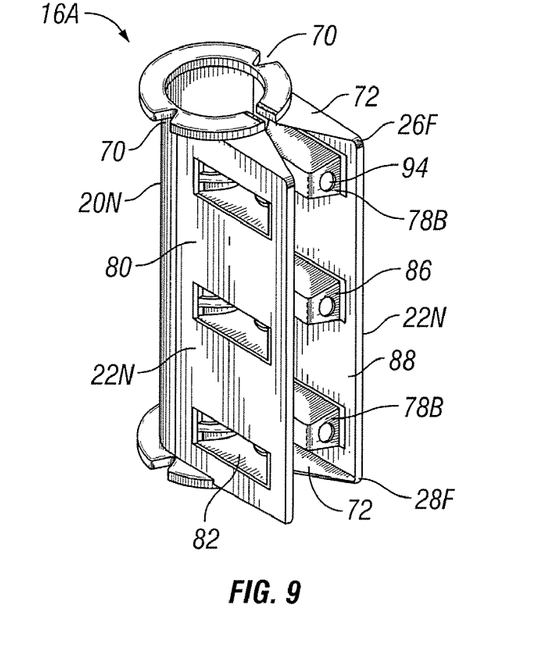
FIG. 9 is a perspective view of an alternate embodiment of the fairing of the present invention.
Figure 10:
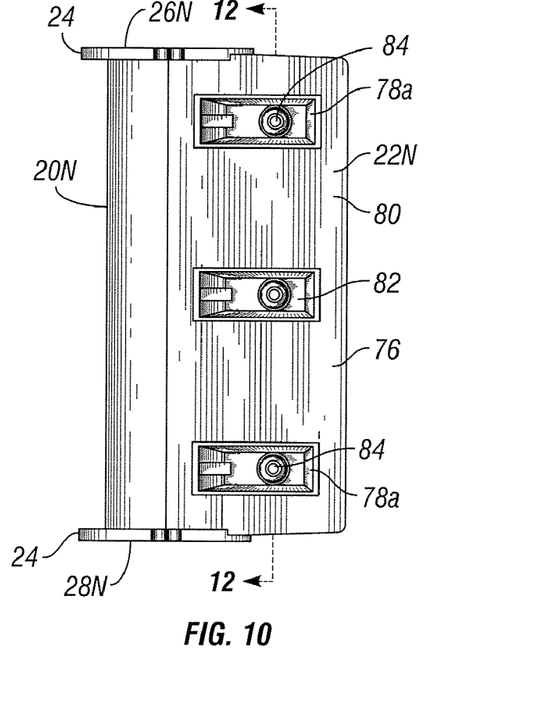
FIG. 10 is a side plan view of the fairing of FIG. 9.
Figure 11:
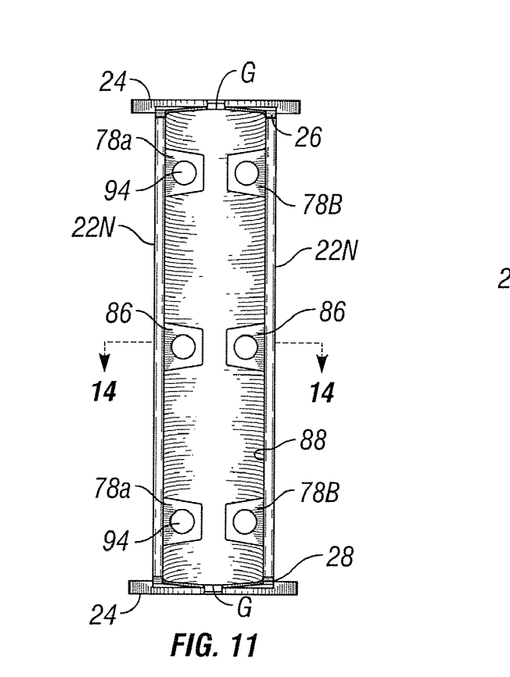
FIG. 11 is a front plan view of the fairing of FIG. 9.
Figure 12:
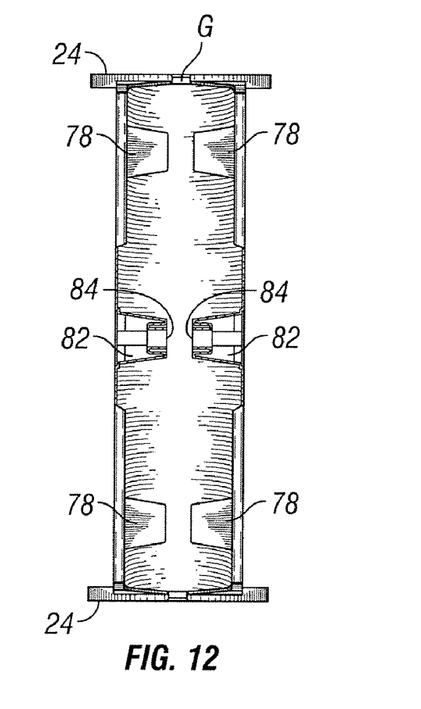
FIG. 12 is a cross-sectional view of the fairing taken along lines 12-12 of FIG. 11.
Figure 13:
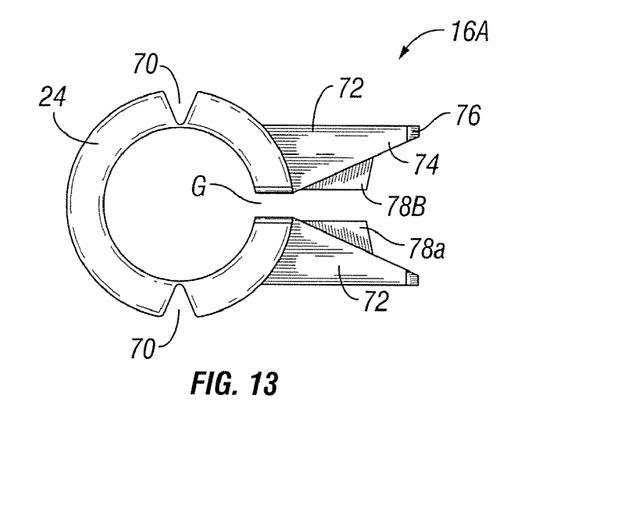
FIG. 13 is a top plan view of the fairing of FIG. 9.

In an alternate embodiment, fairing 16A is formed from a cylindrical shell 20N having opposing fins 22N, extending outwardly in a vertical direction, that define a longitudinal gap G (FIGS. 9 and 13). The spaced apart fins 22N are parallel to each other relative to the center of the circle defining the shell and hence the circumference of the shell 20N (FIG. 13). The gap G in shell 20N provides an opening that allows for placement of the shell 20N around a cylindrical object such as a riser. Fairing 16A also includes a flange 24 at its top 26 and bottom 28 edge, creating a top bearing surface 26N and a bottom bearing surface 28N for the fairing 16A (FIGS. 9-13).

Flange 24 extends around the circumference of the shell 20N and extend outwardly from the shell 20N about 3 to 4 inches. Optionally, flange 24 includes at least one V-shaped cutout 70 to act as opening hinges for the fairing 16A. In a preferred embodiment, the V-shaped cutout can be positioned at the 12:00 o'clock, 3:00 o'clock and 9:00 o'clock position of shell 20N in relation to the gap G at the 6:00 o'clock position. Alternatively, the V-shaped cutout can be placed anywhere on the flange 24. The top and bottom edges 26F, 28F of fins 22N each include a tail section 72 that extends outwardly from the flange 24 at the gap G. The inside edge 74 of each tail section 72 is angled from the edge of the gap G to the outer edge 76 of each fin 22N. The angle depends on the fin length.

Figure 14:
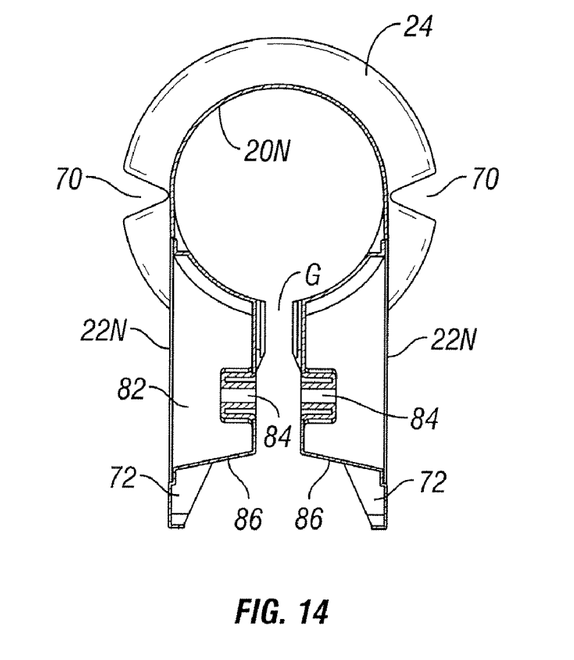
FIG. 14 is a cross-sectional view of the fairing of FIG. 9.
Figure 15A:
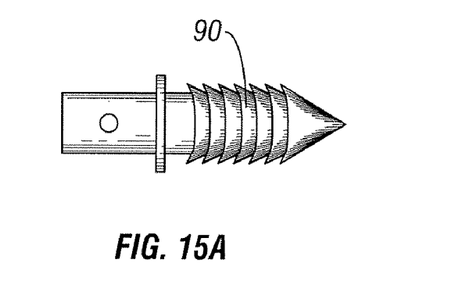
FIGS. 15A and B is a side plan view of a fastener for securing the fairing of FIG. 9 to a raiser.
Figure 15B:
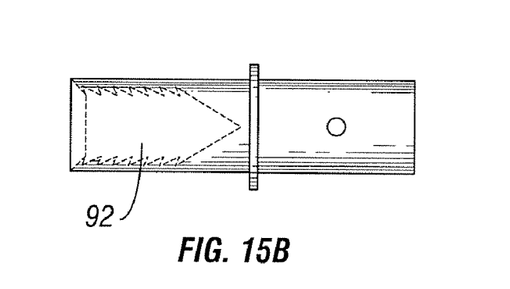

Fins 22N also include a first and second connector 78a, b that form a set of opposed connectors 78. Each fin 22N includes at least two sets of connectors, preferably three sets, for securing the fins 22N together in order to attach them around a riser 14 (FIGS. 9-14). Each connector 78 extends inwardly from the outside surface 80 of each fin 22N, creating a cavity 82 that includes an opening 84 for receiving a fastening means. The walls of each connector 78 taper inward and the opening 84 is offset from the center of the connector 78 toward the outer edge 76 of fin 22N. The cavity 82 of each connector 78a, b forms a rectangular shaped box 86 that extends from the inside surface 88 of the fin 22N and is in horizontal alignment with each tail section 72. In a preferred embodiment, a cover plate (not shown) can be secured over each of the cavity openings. Each connector 78a, b of the set is in parallel alignment with each other. The fastening means for securing the fins 22N together can include male-female connectors 90, 92 or studs, nuts and washers (not shown). In a preferred embodiment, the fastening means are a male and female connector 90, 92 formed from 70 Shore D polyurethane, a 90-95 Shore A polyurethane or glass reinforced polyethylene (FIGS. 15A, 15B). Alternatively, fiberglass/Inconel studs, nuts and washers can be used. The male connector 90 is placed in one 78a of the set of connectors 78 and the female connector 92 is placed in the second 78b of the set of connectors 78 and the fasteners 90, 92 are secured together, drawing the fins 22N together, and thus the faring 16N, around raiser 14. The connectors 78 include hand holes 94 for accessing the fastening means (FIGS. 9, 11, 16, 17).

Figure 23:
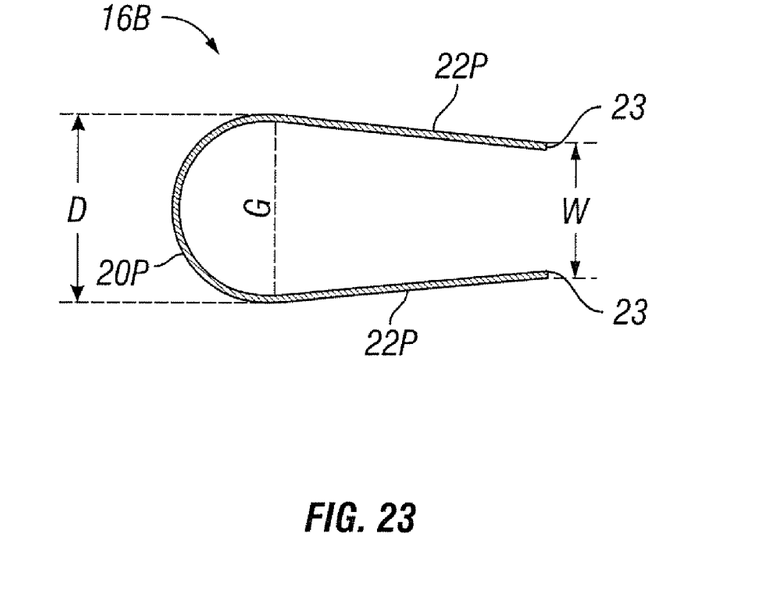
FIG. 23 is a cross-sectional view of an alternate embodiment of the fairing of FIG. 9.
Figure 24:
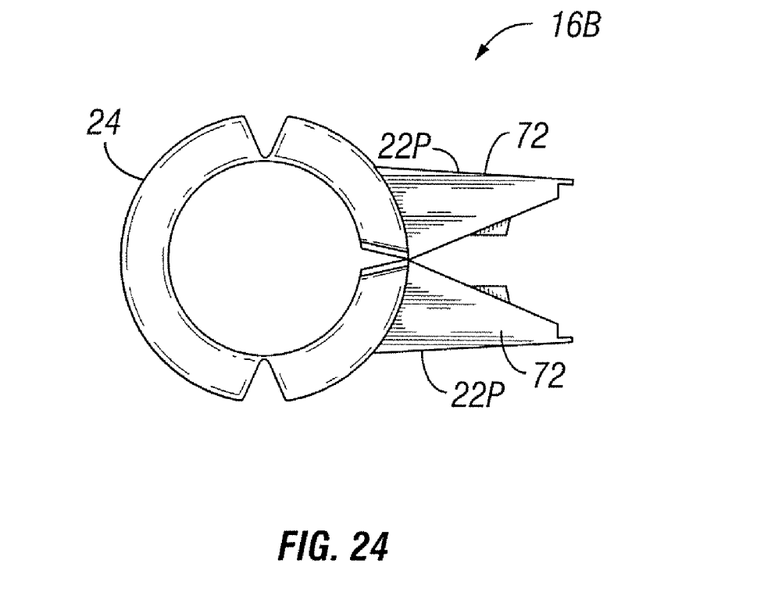
FIG. 24 is top plan view of the fairing of FIG. 23.

Shell 20, 20N has an outer diameter of D and fins 22, 22N have a distance between their ends of W. When W is equal to D the fins are parallel (FIG. 4). It has been found that if W decreases relative to D, i.e. the fins 22, 22N are tapered, the drag is reduced. In an alternate embodiment, fairing 16B is formed from a cylindrical shell 20P having opposing fins 22P, extending outwardly in a vertical direction, that define a longitudinal gap G. However, rather than being parallel, fins 22P are tapered and thus, the distance of W is decreased between the opposing edges 23 of the fins 22P. (FIGS. 23-24) The placement of the fins 22P can be from W=D (parallel) to W=75% of D (tapered). Any decrease of W in relation to D, will result in tapering of the fins 22P. A preferred ratio is W=25% of D which is about a 12.5% reduction for each fin 22P, resulting in a 25% decrease in W with respect to D.

The fins are placed in a direction parallel with the fluid current in order to move the boundary layer vortex eddies further away from the riser 14 without adding significant drag (FIG. 13). Fins 22N, 22P can be any length, however, regardless of the length, fins 22N, 22P do not extend beyond the nominal outer diameter of the shell 20. Preferably, fairing 16A, 16B has dimensions of length to diameter (shell diameter) such that the length to diameter ratio or aspect ratio is in the range of 1.50 to 2.50, preferably equal to or greater than 1.75 to 2.0.

Fairings 16, 16A, 16B would typically range in height from about 2 to 12 feet and would typically have a diameter of about 6 to 48 inches. The shell 20, 20N, 20P is rotatably mounted about a substantially cylindrical element, such as the riser 14, and rotates around the riser 14 to match the fins 22, 22N, 22P with the direction of the current.

Shells 20, 20N and 20P are configured to fit around riser 14 such that they provide for pressure equalization; allow for fluid to reach the bearing face of the shell 20, 20N for lubricating the bearing face with fluid; and to allow for the flow of fluid to retard marine growth. The configuration of the shell also assists in the directional rotation of the shell 20, 20N, 20P around the riser 14 in order to align the fairing 16, 16N, 16P with the current.

Figure 16:
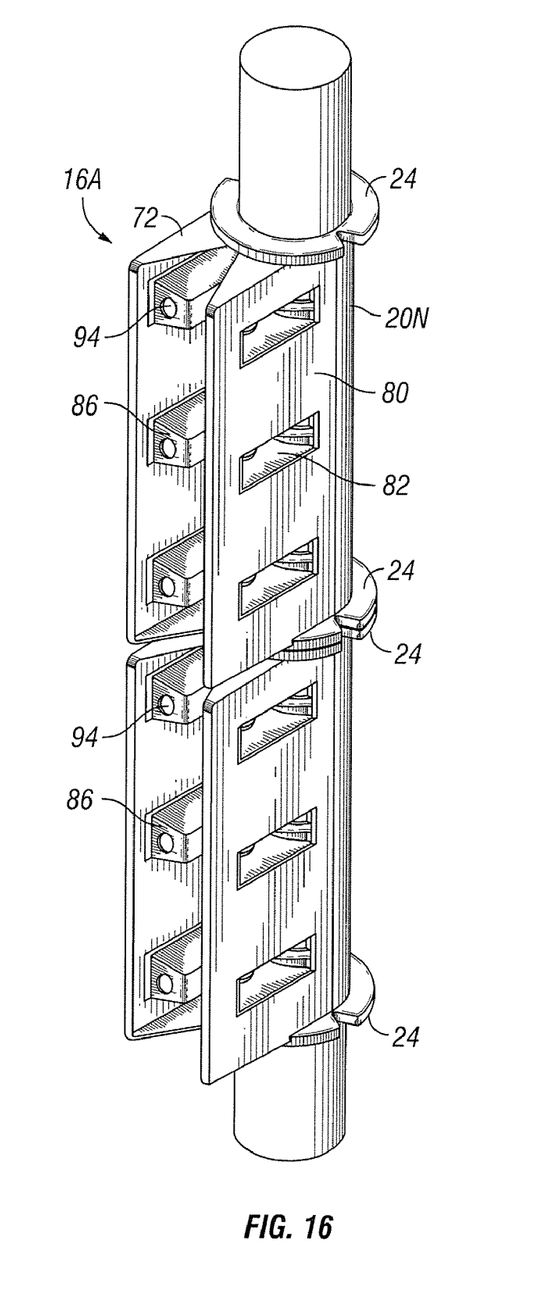
FIG. 16 is a perspective view of a series of fairing segments of FIG. 9.
Figure 17:
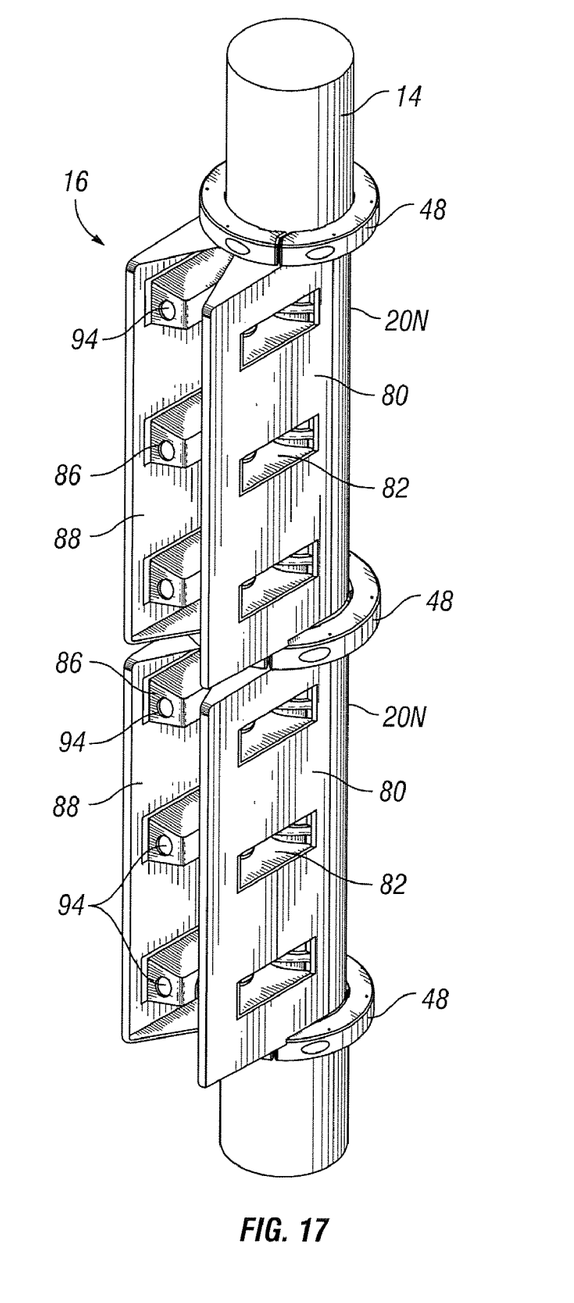
FIG. 17 is an alternate embodiment of a series of fairing segments of FIG. 9.
Figure 18:
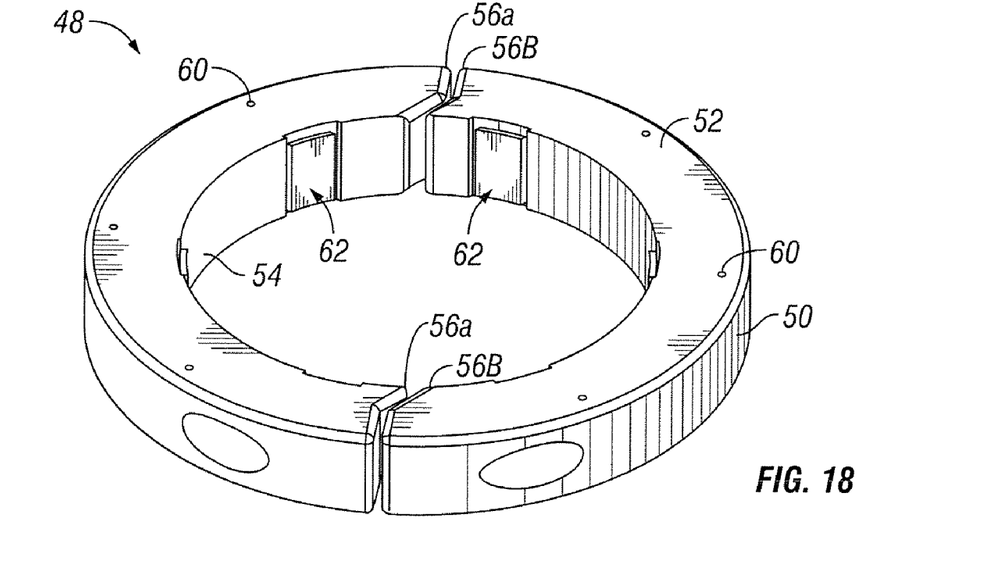
FIG. 18 is a perspective view of one the collars separating the fairing segments of FIG. 17.
Figure 19:
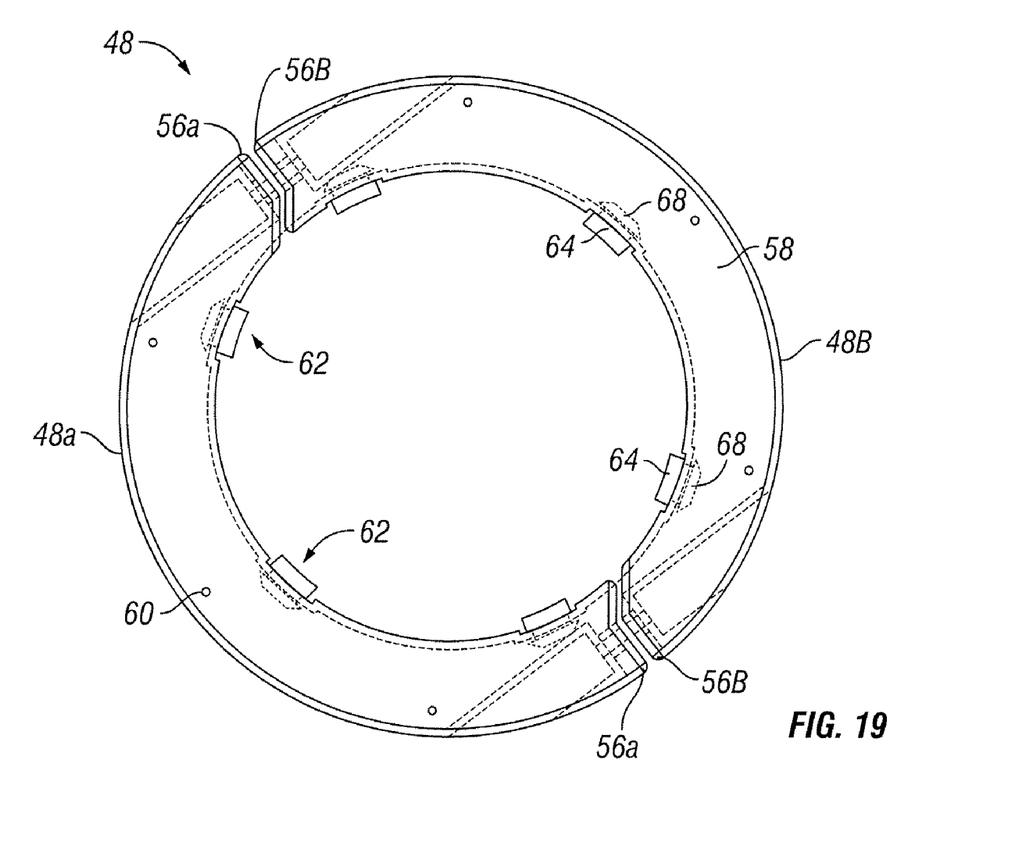
FIG. 19 is a bottom plane view of the collar of FIG. 18.

As shown in FIGS. 16 and 17, a fairing system is contemplated in which a number of fairing segments 16, 16A, 16B can be installed on the riser 14 to rotate independently along a longer elongated element. With fairing segments 16A and 16B, the top and bottom bearing surfaces 26N, 28N of the flanges 24 allow each fairing segment 16A, 16B to freely rotate on the adjoining flanges 24 (FIG. 16). In an alternate embodiment, each fairing segment 16, 16A, 16B may be separated by a two-section collar 48 configured such that it allows each fairing 16, 16A, 16B segment to freely rotate on the collar 48 (FIG. 17). In one embodiment, the circular collar 48 has an outside surface 50, a top surface 52, an inside surface 54 and end sections 56a, b (FIGS. 18, 19). The collar 48 can be any height, for example in one embodiment it can be about 3 inches. The diameter of the collar 48 will depend upon the diameter of the riser 14 it will encircle. The collar 48 also includes a plurality of annulus spacers 62 placed around the inside surface 54 of the collar 48. The annulus spacers 62 secure the collar 48 to the riser 14 and reduce rotational and axial movement of the collar 48 by inducing hoop stress and providing a frictional surface on the riser 14. The spacers 62 extend outwardly from the inside surface 54 such that the ID of annulus spacers 62 is smaller than the ID of the collar 48. The number of spacers 62 on each collar will depend upon the circumference of the collar. In one embodiment, at least six spacers 62 would be used.

Figure 20:
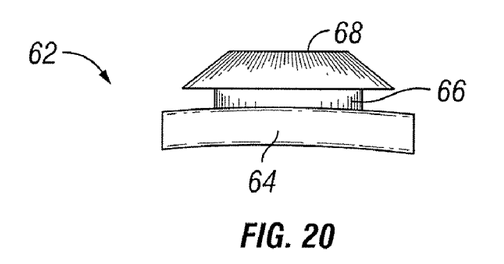
FIG. 20 is a top plan view of an annulus spacer that is inserted in the inside surface of the collar of FIG. 18.

Each annulus spacer 62 has a spacer face 64, and intermediate portion 66 and a spacer retainer 68 (FIG. 20). The spacer retainer 68 is inserted through a spacer hole (not shown) in the inside surface 54 of the collar 48. The spacer retainer 68 is sufficiently flexible that it may be elastically deformed to pass through the spacer hole in the inside surface of the collar 48, while the spacer face 64 is sized to prevent passage through the spacer hole when a determined force is asserted against the spacer face 64. Annulus spacers 62 are constructed of material suitable to induce frictional interaction between the collar 48 and the riser 14. For example, the spacers 62 can be formed from a polyurethane material that provides compliance so that when the two sections 48a, 48b of the collar are secured around the riser 14 there is radial compression from the inside surface 54 of the collar 48 onto the riser 14, thus compressing the polyurethane and causing friction. The two sections 48a, 48b of the collar are placed around the riser 14 and secured on the collar's underside 58 with a securing means such as a bolt, nut and washer threaded through an opening in each of the end sections 56a, b. In a preferred embodiment, the collar will include a plurality of pressure relief holes 60 (FIGS. 14-15).

Fairings 16, 16A, 16B and collar 48 can be constructed from any non-metallic, low corrosive material such as high or low density polyethylene, polyurethane, vinyl ester resin, poly vinyl chloride (PVC), or other materials with substantially similar flexibility and durability properties or multi-layer fiberglass mat. These materials provide fairings 16, 16A, 16B and collar 48 with the strength to stay on the riser 14, but enough flex to allow it to be placed around the riser 14 during installation. The use of such materials eliminates the possibility of corrosion, which can cause the fairing shell to seize up around the elongated element it surrounds.

Figure 21:
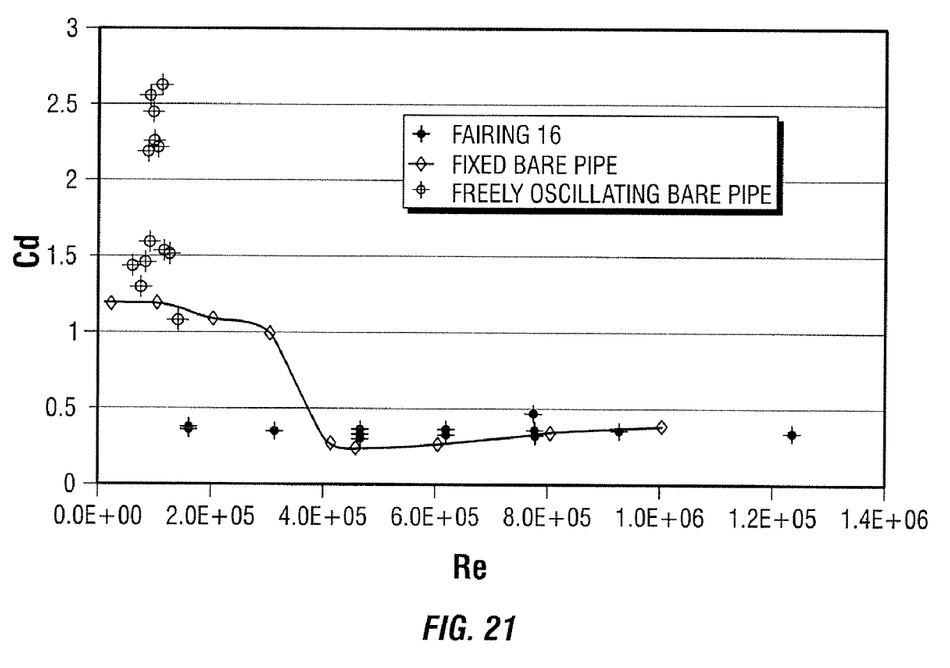
FIG. 21 is a graph of drag coefficient (Cd) for a bare pipe and the inventive fairing by Reynolds number (Re)
Figure 22:
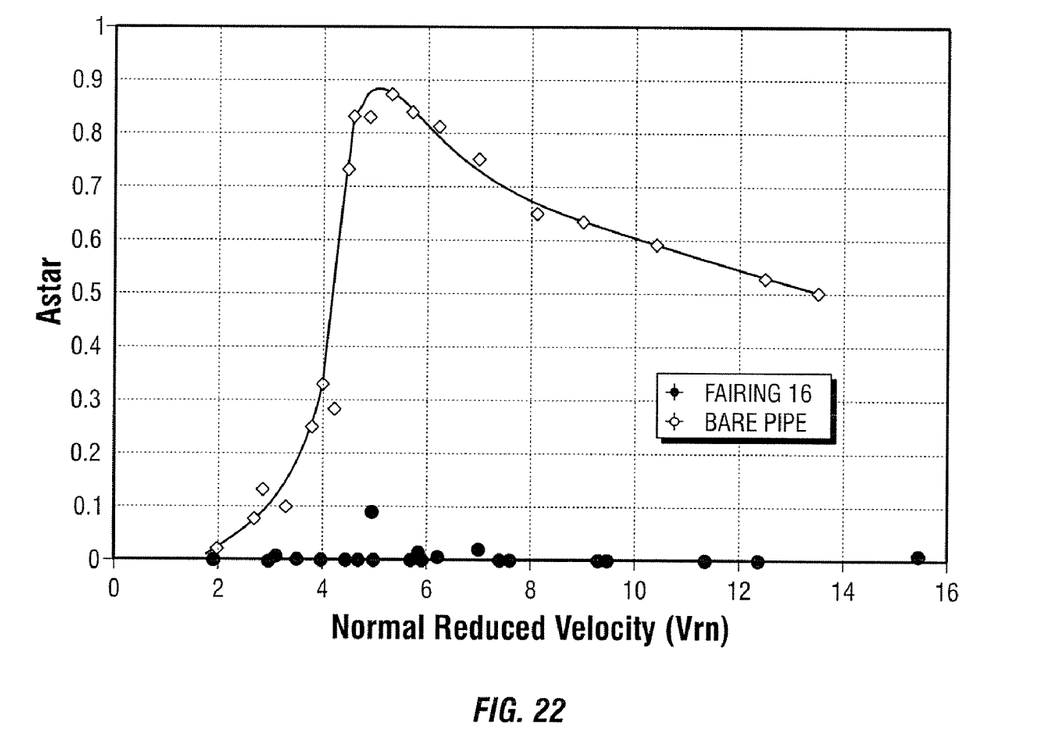
FIG. 22 is a graph of A* by nominal reduced velocity (Vrn) for a bar pipe and the inventive fairing.

FIGS. 21 and 22 present test results demonstrating the surprising effectiveness of the inventive fairing 16. FIG. 21 is a graph of drag coefficient (Cd) for a bare pipe and the ADFS by Reynolds number (Re) and FIG. 22 is a graph of A* by nominal reduced velocity (Vrn), which is defined as Vrn=U/(fn*D) where U is the tow velocity, D the cylinder diameter and fn is the natural frequency of the system. A* is the normalized vibration amplitude which is defined as A*=A/D. For reference, the normalized vibration amplitude of a bare pipe would be expected to be in the range of 0.9 to 1.0 so this fairing decreases the amplitude of vibration by significantly more than 90%.

These tests were conducted in a tow tank with the marine element towed to develop relative motion between the test sample and the water. The test sample was allowed to freely vibrate in the transverse direction. FIG. 21 illustrates the drag coefficient (Cd) for both a bare cylinder and a cylinder protected by the fairing 16. FIG. 22 illustrates the velocity of both a bare cylinder and a cylinder protected by the fairing 16. In both cases, the test sample was allowed to freely vibrate in the transverse direction. Also shown are published curves of Cd by Reynolds number for a fixed bare pipe. The transverse vibration setoff by VIV causes a several-fold increase in Cd. With the fairing 16 installed, drag coefficients are significantly reduced relative to either fixed or freely oscillating pipe to 0.4 or less. Further, the installation of the fairing 16 causes vibration to be reduced by at least 90% and by as much as 95 to 99%. FIG. 22 also illustrates the surprising superior VIV suppression performance of the inventive fairing 16, 16A, showing that the efficiency of the fairing 16, 16A is approximately 95%. A* for a bare pipe is upwards of 0.8 while a pipe equipped with the inventive fairing possesses an A* of approximately 0.01. The graph illustrates that the lateral vibrations caused by VIV are almost totally eliminated.

Figure 25:
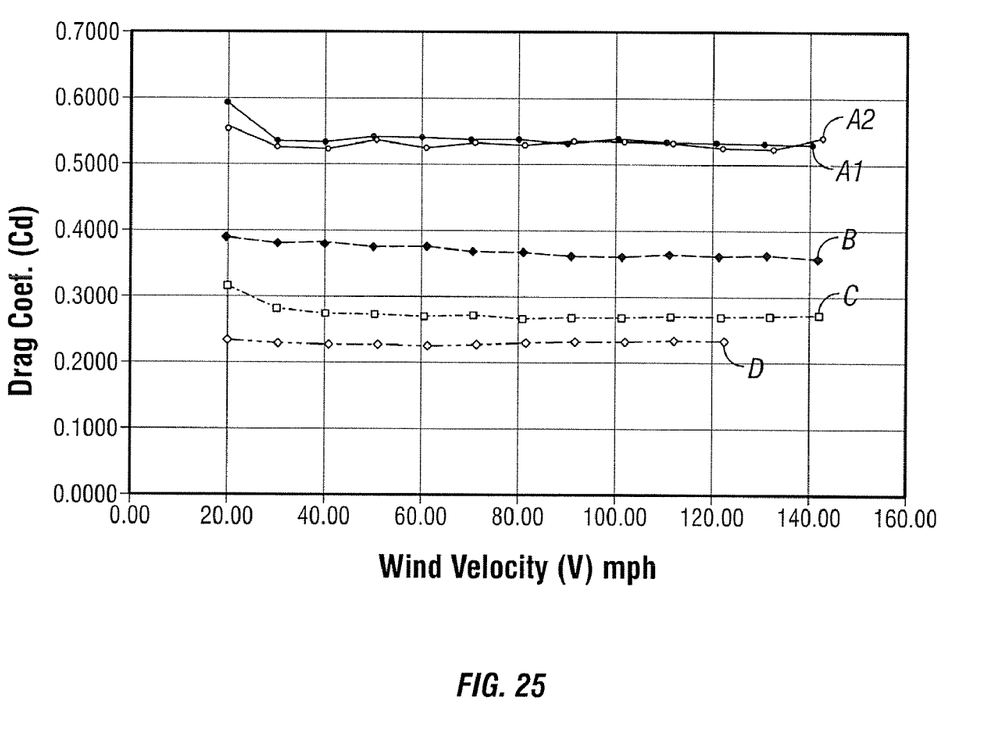
FIG. 25 is a graph of drag coefficient (Cd) compared to velocity (V) in which each line on the graph represents a different W:D ratio.

Tests results have shown, as illustrated in FIG. 25, that as W decreases with respect to D, the drag coefficient is reduced. The graph of FIG. 25 shows Drag Coefficient (Cd) compared to Wind Velocity "V", where each line on the graph represents a different W:D ratio. Lines A1, A2 represents a parallel fin arrangement where W=D; line B represents the drag for a tapered fin where W=75% of D (W=0.75 of D); line C represents the drag for a tapered fin where W=50% of D (W=0.50 of D); and line D represents the drag for a tapered fin where W=5% of D (W=0.05 of D) (nearly touching). Initially as distance of W is decreased from D there is a large change in Cd. As the distance of W is decreased even further the amount of reduction in Cd is less then when initially started. As can be seen from the graph in FIG. 25, a reduction in 25% of the distance of W in relation to D at the beginning shows a large drop is Cd (difference between lines A1, A2 and line B), while the reduction of 50% of the distance W in relation to D to the reduction of 75% of the distance of W in relation to D shows less of a change in Cd (difference between lines C and D). This trend continues till the point where the distance of W is reduced to 0 and the fins 22P are touching.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A fairing for the reduction of vortex-induced vibration, the minimization of drag and the elimination of the galloping phenomenon about a substantially cylindrical element immersed in a fluid medium, comprising:
   a one-piece fairing having a U-shaped cylindrical shell portion at a leading edge of the faring with opposing edges extending toward a trailing edge of the fairing, the opposing edges defining a longitudinal gap, wherein the gap provides an opening that allows for placement of the substantially cylindrical element through the gap and into the shell portion of the fairing; and
   parallel fins extending outwardly from the opposing edges of the shell portion in which the parallel fins taper inward, wherein the parallel fins are positioned so as to reduce vortex-induced vibration and minimize drag on the cylindrical element.

2. The fairing of claim 1, further including a bearing pad configured to fit in the gap in the shell between the shell's opposing edges and the parallel fins.

3. The fairing of claim 2, wherein the bearing pad has a curved inside surface and side surfaces in parallel alignment with each of the fins.

4. The fairing of claim 2, wherein each fairing includes at least one bearing pad for securing the fairing to a cylindrical element.

5. The fairing of claim 4, wherein each fairing includes a plurality of bearing pads for securing the fairing to a cylindrical element.

6. The fairing of claim 1, further including at least a set of opposed connectors for securing the fairing to a cylindrical element, each connector being positioned on an inside surface of each parallel fin.

7. The fairing of claim 6, wherein the fins include a plurality of opposed connectors.

8. The fairing of claim 6, wherein each connector includes an opening configured to receive a fastening means for securing the opposing connectors together.

9. The fairing of claim 6, further including a flange at a top and bottom edge of the fairing, the flange extending around the circumference of the shell and outwardly from the shell.

10. The fairing of claim 9, wherein the flange includes at least one V-shaped cutouts.

11. The fairing of claim 1, wherein each fin does not extend beyond the outer diameter of the shell.

12. The fairing of claim 1, wherein the fairing is constructed from a non-metallic, low corrosive material selected from a group consisting of polyethylene, polyurethane, vinyl ester resin, poly vinyl chloride and fiberglass.

13. The fairing of claim 1, wherein the shell has an outer diameter D and the fins have a distance W between opposing edges of the fins.

14. The fairing of claim 13, wherein the ratio of W to D is from W=D to W =75% of D.

15. A fairing system for the reduction of vortex-induced vibration, the minimization of drag and the elimination of the galloping phenomenon about a substantially cylindrical element immersed in a fluid medium, the fairing system comprising:
a plurality of one-piece fairings having U-shaped cylindrical shell portions at a leading edge of each shell portion, each shell portion having opposing edges extending toward a trailing edge of the fairing, the opposing edges defining a longitudinal gap, wherein the gap provides an opening that allows for placement of the substantially cylindrical element through the gap and into the shell portion;
parallel fins extending outwardly from the opposing edges of each of the plurality of shell portions in which the parallel fins taper inward, wherein the parallel fins are positioned so as to reduce vortex-induced vibration and minimize drag on the cylindrical element; and
means for securing each of the plurality of fairings around the cylindrical element.

16. The fairing system of claim 15, wherein the means for securing the fairings around the cylindrical element includes a bearing pad configured to fit in the gap in each shell between the shell's opposing edges and the parallel fins.

17. The fairing system of claim 16, wherein the bearing pad has a curved inside surface and side surfaces in parallel alignment with each of the fins.

18. The fairing system of claim 16, wherein each fairing includes at least one bearing pad for securing the fairing to a cylindrical element.

19. The fairing of claim 15, wherein the means for securing include at least a set of opposed connectors, each connector being positioned on an inside surface of each parallel fin.

20. The fairing of claim 19, wherein the fins include a plurality of opposed connectors.

21. The fairing of claim 19, wherein each connector includes an opening configured to receive a fastening means for securing the opposing connectors together.

22. The fairing of claim 15, further including a flange at a top and bottom edge of the fairing, the flange extending around the circumference of the shell and outwardly from the shell.

23. The fairing of claim 22, wherein the flange includes at least one V-shaped cutout.

24. The fairing system of claim 22, wherein the flanges on each fairing are configured such that they allows each fairing to freely rotate on an adjoining fairing.

25. The fairing system of claim 15, wherein a circular collar is positioned between each of the plurality of fairings, the collar configured such that it allows each fairing to freely rotate on the collar.

26. The fairing system of claim 25, wherein the collar is in two sections held together by securing means for securing the collar around the cylindrical element.

27. The fairing system of claim 25, wherein the collar includes a plurality of compliant annulus spacers extending outwardly from an inside surface of the collar, the spacers being configured to induce frictional interaction between the collar and the cylindrical element.

28. The fairing system of claim 15, wherein each fin does not extend beyond the outer diameter of the shell.

29. The fairing system of claim 15, wherein the fairing is constructed from a non-metallic, low corrosive material selected from a group consisting of polyethylene, polyurethane, vinyl ester resin, poly vinyl chloride and fiberglass.

30. The fairing system of claim 15, wherein the shell has an outer diameter D and the parallel fins have a distance W between opposing edges of the fins.

31. The fairing of claim 30, wherein the ratio of W to D is from W=D to W=75% of D.

32. The fairing of claim 13, wherein the ration of W to D is from W=D to W=50% of D.

33. The fairing system of claim 30, wherein the ration of W to D is from W=D to W=50% of D.

34. A fairing for the reduction of vortex-induced vibration, the minimization of drag and the elimination of the galloping phenomenon about a substantially cylindrical element immersed in a fluid medium, comprising:
a one-piece fairing having a U-shaped cylindrical shell portion at a leading edge of the faring with opposing edges extending toward a trailing edge of the fairing, the opposing edges defining a longitudinal gap, wherein the gap provides an opening that allows for placement of the substantially cylindrical element through the gap and into the shell portion of the fairing;
parallel fins extending outwardly from the opposing edges of the shell portion in which the parallel fins taper inward, wherein the parallel fins are positioned so as to reduce vortex-induced vibration and minimize drag on the cylindrical element;
a flange at a top and bottom edge of the fairing, the flange extending around the circumference of the shell and outwardly from the shell; and
at least a set of opposed connectors for securing the fairing to the cylindrical element, each connector being positioned on an inside surface of each parallel fin.

* * * * *